United States Patent
Zaccaria et al.

(10) Patent No.: US 10,125,690 B2
(45) Date of Patent: Nov. 13, 2018

(54) METHOD AND SYSTEM FOR STARTING UP AN AIRCRAFT TURBOMACHINE

(71) Applicants: Airbus Operations (SAS), Toulouse (FR); Airbus Operations S.L., Getafe (ES); General Electric Company, Schenectady, NY (US)

(72) Inventors: Patrick Zaccaria, Toulouse (FR); Philippe Chareyre, Madrid (ES); Pio Fernandez-Lopez, Madrid (ES); Carlos Casado-Montero, Madrid (ES); Amid Ansari, Cincinnati, OH (US); Thomas Earl Gillingham, Cincinnati, OH (US); Robert Charles Hon, Cincinnati, OH (US); Daniel Roy Kiracofe, Cincinnnati, OH (US); Kenneth Kirchmayer, Cincinnati, OH (US); Michael Scott McCambridge, Cincinnati, OH (US); Tod Robert Steen, Cincinnati, OH (US)

(73) Assignees: AIRBUS OPERATIONS SAS, Toulouse (FR); AIRBUS OPERATIONS S.L., Getafe (ES); GENERAL ELECTRIC COMPANY, Schenectady, NY (US)

( * ) Notice: Subject to any disclaimer, the term of this patent is extended or adjusted under 35 U.S.C. 154(b) by 760 days.

(21) Appl. No.: 14/314,752

(22) Filed: Jun. 25, 2014

(65) Prior Publication Data
US 2014/0373553 A1    Dec. 25, 2014

(30) Foreign Application Priority Data

Jun. 25, 2013 (FR) .................................. 201356054

(51) Int. Cl.
F02C 7/277 (2006.01)
F02C 7/268 (2006.01)

(52) U.S. Cl.
CPC .............. *F02C 7/268* (2013.01); *F02C 7/277* (2013.01); *F05D 2220/50* (2013.01);
(Continued)

(58) Field of Classification Search
CPC .. F02C 7/277; F05D 2220/50; F05D 2260/85; F05D 2260/96; F05D 2270/114;
(Continued)

(56) References Cited

U.S. PATENT DOCUMENTS 4,473,752 A    9/1984 Cronin
4,627,234 A    12/1986 Schuh
(Continued)

FOREIGN PATENT DOCUMENTS

EP    2305986 A2    6/2011
WO    2013007912    1/2013

OTHER PUBLICATIONS

French Search Report, dated Apr. 29, 2014.

*Primary Examiner* — Arun Goyal
(74) *Attorney, Agent, or Firm* — Greer, Burns & Crain, Ltd.

(57) ABSTRACT

A start-up system including a control system controlling a partial opening of an air intake valve of a start-up turbine during a first phase of the start-up. The start-up turbine is capable of turning a rotor of the turbomachine for the purpose of the start-up, so as to prevent the rotor from encountering critical frequencies of the turbomachine.

5 Claims, 2 Drawing Sheets

(52) U.S. Cl.
CPC ...... *F05D 2260/85* (2013.01); *F05D 2260/96* (2013.01); *F05D 2270/114* (2013.01); *F05D 2270/304* (2013.01)

(58) Field of Classification Search
CPC ......... F05D 2270/304; F05D 2270/333; F05D 2270/334
See application file for complete search history.

(56) References Cited

U.S. PATENT DOCUMENTS

| | | | |
|---|---|---|---|
| 5,127,220 A | 7/1992 | Jesrai et al. | |
| 6,575,699 B1 | 6/2003 | Jones | |
| 6,684,898 B2* | 2/2004 | Wiggins | F02C 7/277 137/15.25 |
| 8,555,653 B2* | 10/2013 | Snider | F01D 19/00 60/773 |
| 8,635,876 B2* | 1/2014 | Ceric | F01D 17/12 60/772 |
| 8,752,392 B2* | 6/2014 | Gazzino | F02C 7/26 60/787 |
| 9,567,906 B2* | 2/2017 | Nesdill | F02C 7/057 |
| 2010/0085676 A1 | 4/2010 | Wilfert | |
| 2012/0266606 A1* | 10/2012 | Zeiner | F02C 7/277 60/788 |
| 2014/0123673 A1* | 5/2014 | Mouze | F01D 19/02 60/778 |
| 2014/0373552 A1 | 6/2014 | Zaccaria et al. | |
| 2014/0373518 A1* | 12/2014 | Manneville | F01D 19/02 60/327 |
| 2015/0377141 A1* | 12/2015 | Foiret | F02C 7/057 701/113 |

* cited by examiner

METHOD AND SYSTEM FOR STARTING UP AN AIRCRAFT TURBOMACHINE

CROSS-REFERENCES TO RELATED APPLICATIONS

This application claims the benefit of the French patent application No. 201356054 filed on Jun. 25, 2013, the entire disclosures of which are incorporated herein by way of reference.

BACKGROUND OF THE INVENTION

The present invention relates to a method and a system for starting up a turbomachine of an aircraft, in particular of a transport airplane.

The invention applies to a start-up system of the type comprising:
- a ventilation source, in particular an axillary power unit (APU), which is able to produce an airflow and which comprises a compressor fed by an air intake circuit regulated by at least one controllable inlet valve; and
- a start-up turbine, which is fed by said ventilation source via a pneumatic connection and which is able to produce, when subjected to a fluid flow, a mechanical force making it possible to turn a rotor of the engine (turbomachine) of the aircraft for the purpose of the start-up.

The engine is then switched on, in the conventional manner, after injection of fuel in the appropriate elements of the engine, which have been rotated by the rotor.

It is known that, during an operating cycle of an airplane, in particular of a short-haul or medium-haul transport airplane, the airplane lands at an airport generally so as to allow the passengers to disembark and so as to allow other passengers to embark before departing for another destination. This change of passengers generally lasts between thirty minutes and one hour and thirty minutes.

During this time, the engines of the airplane, which are stopped (for reasons of safety), remain hot and do not have time to cool completely. It is estimated that, generally, an engine is cold after having been stopped for approximately one hour and thirty minutes.

Thus, during the waiting time, a thermal gradient at the rotor or the rotors of the engine causes the expansion of some blades and/or of the rotor or rotors, which deform (causing a reduction of the axial or diametrical play with respect to the normal axis of rotation of the blading, an expansion of the blades, etc.).

During the restart, if the engine has not had time to cool sufficiently, the ends of some blades of the rotor are at risk of rubbing against the casing, or a blading will be slightly offset from its axis of rotation. This phenomenon, referred to as "bowed rotor", lasts until the temperature between the bladings becomes uniform due to the operation (rotation and reduction of internal thermal gradients, realignment of the turning parts) of the engine.

The rotation of incorrectly aligned turning parts of the engine leads to vibrations due to the imbalance. These vibrations become particularly disadvantageous when the speed of rotation of the turning parts (rotor) approaches a critical frequency (or speed) of the engine, due to the specific amplification of rotor/stator friction in the vicinity of the vibratory resonances.

The aforementioned phenomenon causes a significant increase of the fuel consumption due to a loss of aerodynamic efficacy in particular of different elements of the engine, moreover irreversibly (wear of the ends of the blades).

SUMMARY OF THE INVENTION

An object of the present invention is to prevent (or at least limit) such vibrations, which are very disadvantageous, caused by imbalance during the start-up of a turbomachine.

The invention relates to a method for starting up an aircraft turbomachine with the aid of a start-up system of the type comprising at least:
- one ventilation source able to produce an airflow and provided with a compressor fed by an air intake circuit regulated by at least one inlet valve, said inlet valve being able to be controlled; and
- at least one start-up turbine fed by said ventilation source via a pneumatic connection, said start-up turbine being able to produce, when subjected to a flow of air, a mechanical force making it possible to turn a rotor of the turbomachine for the purpose of the start-up.

In accordance with the invention, said method comprises at least two successive steps:
- a first step (representing a prevention mode), during which said inlet valve is open partially, such that the ventilation source transmits a limited flow of air to said start-up turbine, this limited flow of air being such that said start-up turbine turns said rotor at a speed of rotation that is lower than a critical speed; and
- a second step (representing a primary mode), during which said inlet valve is completely open, such that the ventilation source transmits a maximum flow of air to said start-up turbine.

Thus, at the start of the start-up during said first step, due to only a partial opening of the inlet valve, the rotor is brought to a speed of rotation that is lower than a critical speed (or frequency), that is to say the weakest (encountered first) critical frequency when there are a number of said frequencies, thus making it possible to avoid the very disadvantageous vibrations caused by the imbalance when the speed of rotation of the turning parts approaches a critical frequency of the engine. During this first step, the temperature becomes uniform again at the rotor and turning parts of the turbomachine, and the deformations as well as the imbalance of turning parts decrease.

Said second step (during which the inlet valve is completely open, such that the speed (or speed of rotation) of the rotor is increased as far as a maximum speed, said increase causing the speed of the rotor to pass through one or more critical frequencies), is only implemented when the imbalance of the turning parts has become sufficiently low that the passing of the rotor speed through critical frequency/frequencies of the engine is no longer disadvantageous, as detailed further below.

Thus, the present invention makes it possible to overcome the aforementioned drawback and to prevent (or at least limit) very disadvantageous vibrations by avoiding encountering critical frequencies of the engine while there is a significant phenomenon of the "bowed rotor" type.

In a first embodiment said first step is implemented for a predetermined period, at the end of which said second step is implemented.

In addition, in a second embodiment, said method additionally comprises a step of determining a period referred to as a plateau period, prior to said first step, and said first step is implemented for a period equal to said plateau period. Said step of determining a plateau period preferably consists of measuring the value of at least one of the following parameters: the off time of the turbomachine, an external pressure and an external temperature, and of calculating the plateau period with the aid of said measured value.

In addition, in a third embodiment, a monitoring is performed during said first step in order to verify whether at least one condition representative of the absence of a deformation of thermomechanical origin at the turbomachine is met, and said second step is implemented as soon as it is detected that such a condition is met. Said monitoring advantageously consists of measuring the value of at least one parameter, preferably a vibration over the body of the turbomachine, comparing this measured value with a predetermined value, and deducing therefrom, as the case may be, a detection of said condition representative of the absence of a deformation.

In addition, in a first variant, the inlet valve is brought into and held in a partial open position during said first step, said position having a predetermined valve angle of aperture, whereas, in a second variant, said method additionally comprises a step of determining a valve angle of aperture, prior to said first step, the inlet valve being brought into and held during said first step in an open position having the valve angle of aperture thus determined.

The present invention also relates to a system for starting up an aircraft turbomachine.

In accordance with the invention, said start-up system of the type comprising:
- a ventilation source able to produce a flow of air and provided with a compressor fed by an air intake circuit regulated by at least one inlet valve, said inlet valve being able to be controlled;
- at least one start-up turbine fed by said ventilation source via a pneumatic connection, said start-up turbine being able to produce, when subjected to a flow of fluid, a mechanical force making it possible to turn a rotor of the turbomachine for the purpose of the start-up; and
- a control system capable of controlling at least said inlet valve, is notable in that said control system is configured to control a partial opening of said inlet valve during a first phase of the start-up, such that the ventilation source then transmits a limited flow of air to said start-up turbine, this limited flow of air being such that said start-up turbine turns said rotor at a speed of rotation that is lower than a critical speed, and to control a complete opening of said inlet valve during a second phase of the start-up, such that the ventilation source then transmits a maximum flow of air to said start-up turbine (such that the start-up system functions in the conventional manner).

Thus, thanks to the invention, the control system of said start-up system is configured, as detailed further below, to control a partial opening of said inlet valve during a first phase of the start-up (corresponding to said first step of the method) so as to avoid encountering critical frequencies of the rotor of the turbomachine while a phenomenon of the "bowed rotor" type remains significant.

Said start-up system may comprise at least some of the following elements, taken individually or in combination:
- at least one first sensor for measuring a first parameter making it possible to provide a piece of information concerning a deformation of thermomechanical origin prior to the rotation of the rotor, the measured value of said first parameter being provided to the control system so as to determine a plateau period; and
- at least one second sensor for measuring a second parameter making it possible to provide a piece of information concerning a deformation of thermomechanical origin during the rotation of the rotor, the measured value of said second parameter being provided to the control system so as to determine a condition representative of the absence of a deformation (so as to switch from the prevention mode to the primary mode).

Furthermore, in a particular embodiment, said control system comprises a first and a second control unit connected together, said first control unit being configured to receive data, carry out processing operations and transmit a piece of control information to said second control unit, and said second control unit being configured to control the opening of said inlet valve based on the piece of control information received from said first control unit.

BRIEF DESCRIPTION OF THE DRAWINGS

The accompanying drawings will help to explain how the invention can be implemented. In these figures, identical references denote similar elements.

DETAILED DESCRIPTION OF THE PREFERRED EMBODIMENTS

Figure 1:
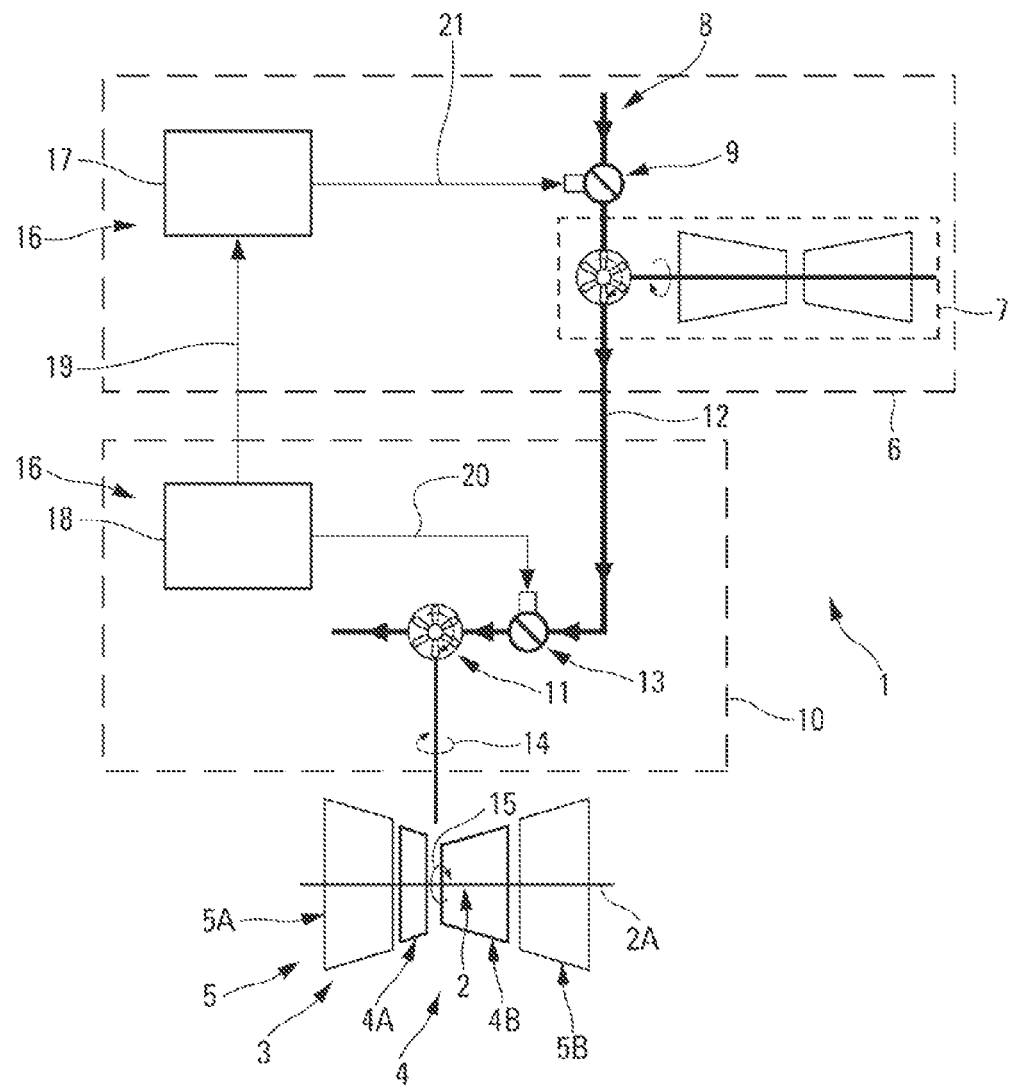
FIG. 1 is the circuit diagram of a system for starting up a turbomachine, illustrating one embodiment of the invention.

The start-up system 1 illustrating the invention and shown schematically in FIG. 1 is intended to rotate a rotor 2 of a turbomachine 3 of an aircraft for the purpose of starting up the turbomachine 3.

In a preferred embodiment, said turbomachine 3 is an aircraft turbofan. Such a turbojet conventionally and generally comprises:
- a high-pressure coupling 4 provided with a high-pressure compressor 4A and a high-pressure turbine 4B connected together by means of the shaft 2A of said rotor 2; and
- a low-pressure coupling 5 provided with a low-pressure compressor 5A and a low-pressure turbine 5B.

Said start-up system 1 is of the type comprising:
- a ventilation source 6, in particular an auxiliary power unit (APU). This ventilation source 6 is able to produce a flow of air and comprises a conventional compressor 7 (not described further), which is fed by an air intake circuit 8 regulated by at least one controllable inlet valve 9, for example of the IGV (inlet guide vane) type. The ventilation source 6 is put into operation in the conventional manner by the pilot before the procedure of starting the engine (turbomachine 3); and
- a start-up device 10 comprising a start-up turbine 11, which is fed by said ventilation source 6 via a pneumatic connection (pipe) 12. This pneumatic connection 12 comprises at least one controllable start-up valve 13, for example a start-up valve of the SAV (starter air valve) type, which is arranged upstream of the start-up turbine 11 (in the direction of air flow, indicated by arrows on the connection 12 of FIG. 1). The start-up turbine 11 is able to produce, when subjected to a flow of air (originating from the ventilation source 6), a mechanical force (illustrated by an arrow 14 in FIG. 1) making it possible to turn the rotor 2 of the turbomachine 3, as illustrated by an arrow 15, so as to start said turbomachine.

This rotation of the rotor 2 (the high-pressure rotor of the engine) makes is possible, in the conventional manner, to compress the air that reaches the combustion chamber of the engine. The engine is then switched on by injection of fuel into the combustion chamber and by ignition of the air/fuel mixture.

Said start-up system 1 further comprises a control system 16 capable of controlling in particular said inlet valve 9.

In the embodiment of FIG. 1, this control system 16 comprises two control units 17 and 18 connected together by means of a connection 19. The control unit 18, in particular a control unit of the ECU (engine control unit) type, is intended in particular to control said start-up valve 13 via a connection 20. A control unit 18 of the ECU type is conventionally and generally a computer dedicated to the operation of the engine, said computer commanding actuators in the engine, in order to control the engine, via signals transmitted by sensors of the engine and of the aircraft, and via commands from the pilot. This control unit 18 is in particular configured to receive data, to perform processing operations and to transmit control information to the control unit 17. Said control unit 17, in particular an electronic regulator of the ECB (electronic control board) type, is configured, for its part, to control the opening of the inlet valve 9 based on the control information received from said control unit 18. This control information takes the form of an indicator, as detailed further below.

In accordance with the invention, said control system 16 is configured:

- to control a partial opening of the inlet valve 9 during a first start-up phase, such that the ventilation source 6 then transmits a limited flow of air to said start-up turbine 11 via the pipe 12 and the start-up valve 13, which is open. This limited flow of air is such that the start-up turbine 11 turns said rotor 2 at a speed of rotation that is lower than a critical speed; and
- to control a complete opening of said inlet valve 9 during a second phase of the start-up, such that the ventilation source 6 then transmits a maximum flow of air to said start-up turbine 11 (in accordance with conventional operation).

The inlet valve 9 intended to regulate the air intake circuit 8 can be formed in different ways and makes it possible to regulate the amount of air that circulates in the pipe 12. The angle of aperture of the inlet valve is adjusted with precision by an actuator, said angle of aperture being adjustable within the entire available range. This angle of aperture is controlled by the control unit 17.

This start-up system 1 makes it possible to implement a specific method of rotating the rotor 2 and of starting up the turbomachine 3. In accordance with the invention, this method comprises the following successive steps, during which the start-up valve 13 is (completely) open, that is to say:

- a first step (representing a prevention mode), during which the inlet valve 9 is controlled by the control system 16 so as to be partially open, such that the ventilation source 6 transmits a limited flow of air to said start-up turbine 11. This limited flow of air is such that the start-up turbine 11 turns the rotor 2 at a speed of rotation that is lower than a first critical speed (that is to say is lower than the lowest critical speed encountered first during the speed increase when there are a number of successive critical speeds), moreover close to a safety margin; and
- a second step (representing a primary mode) following said first step (or prevention mode), during which said inlet valve 9 is controlled by the control system 16 so as to be completely open, such that the ventilation source 6 then transmits a maximum flow of air to said start-up turbine 11.

Thus, at the start of rotation (or start-up) during said first step (prevention step), and moreover as long as there is a risk of generation of disadvantageous vibrations caused by the imbalance as the rotor speed passes through critical speeds, only a limited flow of air is transmitted to the start-up turbine 11, such that the rate of rotation is limited.

Figure 2:
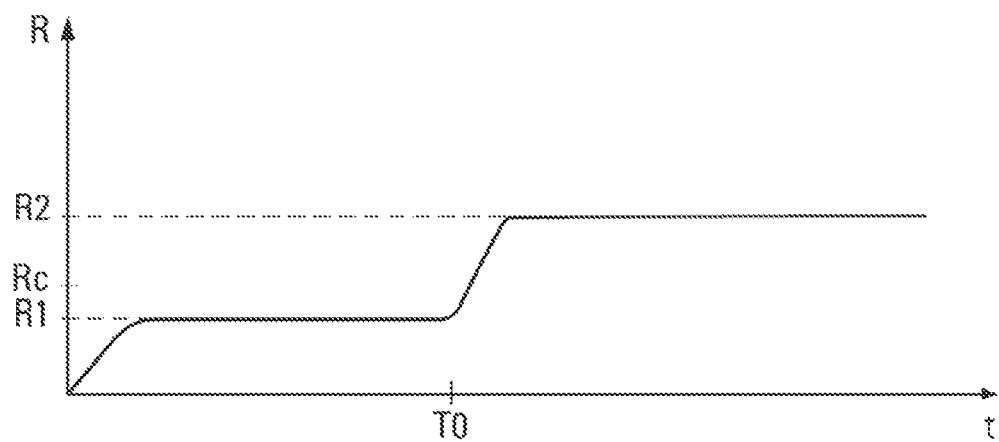
FIG. 2 is a graph illustrating the rate of rotation with a plateau during implementation of the invention.

Thus, during the period T0 of said first step, a limitation of the rate (or speed) of rotation R at a plateau R1 lower (close to a margin) than the first critical frequency (corresponding to a speed Rc) of the turbomachine 3 is created, as illustrated schematically in FIG. 2 (which shows the speed R as a function of time t). During this period T0 the temperature becomes relatively uniform at the rotor 2 and the turning parts of the turbomachine 3, and the deformations and also the imbalance of the turning parts decrease.

With regard to the second step (primary mode), during which a maximum flow of air (generated by the ventilation source 6) is transmitted to the start-up turbine 11, such that the maximum speed R2 is reached, this step is implemented when the temperature gradient has been sufficiently reduced and the imbalance of the turning parts has become sufficiently low that the passing of the rotor speed through the critical frequency/frequencies of the engine is no longer disadvantageous.

The inlet valve 9 thus makes it possible, as a result of suitable control, to create a plateau R1 allowing a limited flow of air at the inlet of the start-up turbine 11. In addition, during the initiation of the prevention mode and during the switching from the prevention mode to the primary mode via the progressive opening of the inlet valve 9 (from the closed position to the partial open position or from this latter position to the complete opening of said valve), a variation of the intake flow of air is obtained, enabling a progressive increase of the speed of rotation.

In a first variant, during said first prevention step, the inlet valve 9 is brought into and held in a partial open position having a predetermined valve angle of aperture.

In addition, in a second variant, a step of determining a valve angle of aperture is provided prior to said first step, and, during said first step, the inlet valve 9 is brought into and held in an open position having the valve angle of aperture thus determined. The control unit 17 adjusts the position of the inlet valve 9 in accordance with tabulated valves stored in a non-volatile memory of said control unit 17.

In a simplified embodiment, during the rotation of the rotor 2, the control system 16 switches the start-up system 1 into the prevention mode, then at the start of a period T0, which is predetermined, switches it into the primary mode. By way of illustration, in order to prevent a phenomenon of the "bowed rotor" type, a period T0 of approximately 25 to 50 seconds is compatible with the decrease of the corresponding internal thermal gradient (in the bladings of the rotor and in the internal cavities of the engine).

In a developed embodiment, a step of determining a period referred to as a plateau period is additionally provided prior to said first prevention step, and said first prevention step is implemented during a period equal to the plateau period thus determined.

Figure 3:
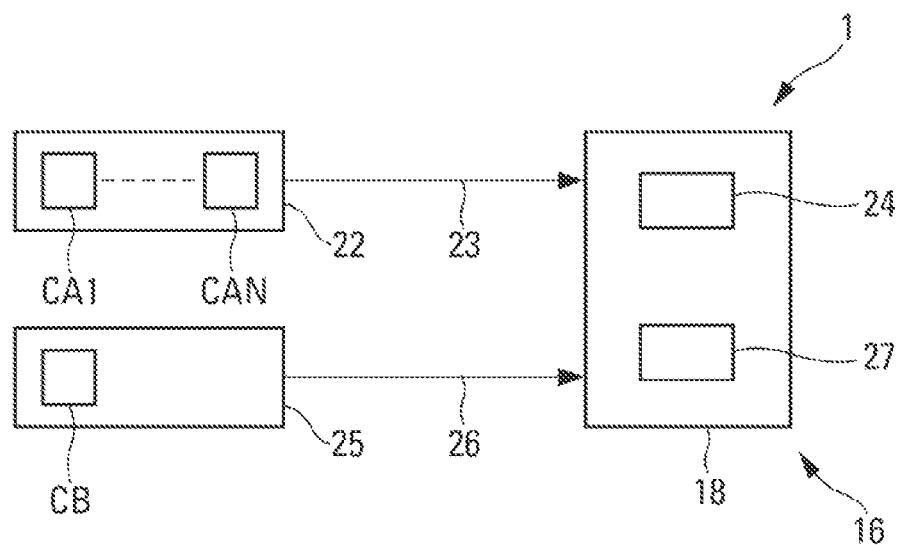
FIG. 3 shows a particular embodiment of detection means forming part of a start-up system.

To do this, the system 1 comprises a detection unit 22, which is connected by means of a connection 23 to the control unit 18, as shown in FIG. 3, and which is configured to measure the value of at least one parameter making it possible to provide information concerning a deformation of thermomechanical origin of parts of the turbomachine 3 prior to the rotation of the rotor 2. Said detection unit 22, for this purpose, comprises at least one sensor, preferably a plurality of sensors CA1 to CAN, N being an integer greater than 1.

By way of illustration, said detection unit 22 may comprise, as sensors CA1 to CAN, at least some of the following sensors:

- a clock for determining the switch-off time of the turbomachine 3. Beyond a certain period (for example beyond 1 h 30 for the aforementioned phenomenon of the "bowed rotor" type), the rotor 2 is assumed to be cold and it is also assumed that there is no risk of deformation;
- one or more sensors for sensing the temperature of the turbomachine 3 and/or the temperature externally of the turbomachine 3;
- one or more pressure sensors; and
- one or more anemometric probes.

The value(s) measured by the detection unit 22 is/are transmitted to a calculation element 24, which is for example integrated in the control unit 18. This calculation element 24 determines the plateau period with the aid of the measured value(s), in particular based on the off time of the engine and the external pressure and temperature conditions. This calculation is made at the moment of activation of the start-up sequence of the engine by the aircraft crew (whereas the engine therefore has not yet started to turn). During the plateau (prevention step), the indicator sent by the control unit 18 to the control unit 17 via the connection 19 is a Boolean. This indicator set to 1 is indicative of the fact that the turning parts of the engine exhibit an imbalance that would degrade the state of the engine if the critical frequencies of the engine were crossed under these conditions.

In addition, in a further embodiment, the end of the prevention mode is determined by the control system 16 based on data collected at the turbomachine 3. These data are compared with a threshold, and the passing of this threshold (in one direction or another based on the data considered) causes the switching of the start-up system 1 by the control system 16 into the primary mode (and therefore the end of the prevention mode). This information is obtained when the rotor 2 is driven in rotation, the two valves 9 and 13 being open.

To do this, the system 1 comprises a detection unit 25, which is connected by means of a connection 26 to the control unit 18, as shown in FIG. 3, and which is configured to measure the value of at least one parameter making it possible to provide information concerning a deformation of thermomechanical origin of said rotor 2 during the rotation (prevention step).

This detection unit 25 comprises at least one sensor CB. In a preferred embodiment, this sensor CB is a sensor of mechanical vibrations indicative of a deformation, and is preferably an accelerometer installed on the body of the primary engine. The electric signal of this sensor CB is transmitted by means of a connection 26 to a computer 27, which for example is integrated in the control unit 18. This computer 27 compares the measured value (relative to the vibration of the high-pressure rotor 2 in the case of a turbofan) with a predetermined threshold value, and, as the case may be, deduces therefrom a detection of the aforementioned condition of mode switching. Said second step is implemented as soon as such a condition is detected, that is to say as soon as the measured vibration becomes lower than a predetermined threshold, which indicates that the imbalance has been reabsorbed and that it is no longer necessary to maintain an intermediate plateau R1.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method for starting up an aircraft turbomachine with the aid of a start-up system comprising at least:
   one ventilation source able to produce and provide a flow of air with a compressor fed by an air intake circuit regulated by at least one inlet valve, said inlet valve being able to be controlled; and
   at least one start-up turbine fed by said ventilation source via a pneumatic connection, said start-up turbine being able to produce, when subjected to the flow of air, a mechanical force making it possible to turn a rotor of the turbomachine for a purpose of the starting up,
   wherein said method comprises at least two successive steps:
   a first step, during which said inlet valve is open partially from a closed position to start rotation of the rotor, such that the ventilation source transmits a limited flow of air to said start-up turbine, the limited flow of air being such that said start-up turbine turns said rotor at a speed of rotation that is lower than a critical speed; and
   a second step, during which said inlet valve is completely open, such that the ventilation source transmits a maximum flow of air to said start-up turbine,
   wherein the method further comprises a step of determining a plateau period prior to said first step,
   wherein said step of determining the plateau period comprises measuring a value of at least one of the following parameters:
   an off-time of the turbomachine,
   an external pressure,
   an external temperature, and
   calculating the plateau period with aid of said value,
   wherein the speed of the rotor of the turbomachine is maintained for a time duration defined by said plateau period, and wherein, during said plateau period, the speed of the rotor of the turbomachine is maintained below the critical speed to avoid vibrations caused by an imbalance as the speed of the rotor of the turbomachine passes through the critical speed, and
   wherein said first step is implemented for a period equal to said plateau period.

2. The method as claimed in claim 1, wherein said inlet valve is brought into and held in said partially open position during said first step, said position having a predetermined valve angle of aperture.

3. The method as claimed in claim 1, further comprising a step of determining a valve angle of aperture, prior to said first step, and wherein said inlet valve is brought into and held during said first step in said partially open position having the valve angle of aperture.

4. A system for starting up an aircraft turbomachine, said system comprising:
   a ventilation source able to produce and provide a flow of air with a compressor fed by an air intake circuit regulated by at least one inlet valve, said inlet valve being able to be controlled;

at least one start-up turbine fed by said ventilation source via a pneumatic connection, said start-up turbine being able to produce, when subjected to the flow of air, a mechanical force making it possible to turn a rotor of the turbomachine for a purpose of the starting up; and a control system capable of controlling at least said inlet valve, wherein said control system is configured to control a partial opening of said inlet valve from a closed position to start rotation of the rotor during a first phase of the starting up such that the ventilation source then transmits a limited flow of air to said start-up turbine, the limited flow of air being such that said start-up turbine turns said rotor at a speed of rotation that is lower than a critical speed, and to control a complete opening of said inlet valve during a second phase of the starting up, such that the ventilation source then transmits a maximum flow of air to said start-up turbine, the system further comprising at least one first sensor for measuring a first parameter making it possible to provide a piece of information concerning a deformation of thermomechanical origin prior to the rotation of the rotor of the turbomachine, the measured value of said first parameter being provided to the control system so as to determine a plateau period prior to the first phase, wherein the speed of the rotor of the turbomachine is maintained for a time duration defined by said plateau period, and the speed of the rotor of the turbomachine is maintained below the critical speed to avoid vibrations caused by an imbalance as the speed of the rotor of the turbomachine passes through the critical speed.

5. The system as claimed in claim 4, wherein said control system comprises a first control unit and a second control unit connected together, wherein said first control unit is configured to receive data, carry out processing operations and transmit a piece of control information to said second control unit, and wherein said second control unit is configured to control the opening of said inlet valve based on the piece of control information received from said first control unit.

* * * * *